United States Patent [19]

Mizuguchi et al.

[11] 4,141,018
[45] Feb. 20, 1979

[54] THERMAL RECORDING HEAD AND DRIVE CIRCUIT

[75] Inventors: Mamoru Mizuguchi; Masasumi Yana; Norio Nakamura; Haruo Yamanaka, all of Yokohama; Kiyosi Goto, Tokyo, all of Japan

[73] Assignee: Tokyo Shibaura Electric Co., Ltd., Kawasaki, Japan

[21] Appl. No.: 849,424

[22] Filed: Nov. 7, 1977

[30] Foreign Application Priority Data

Nov. 8, 1976 [JP] Japan .................................. 51-133909
Nov. 8, 1976 [JP] Japan .................................. 51-133910

[51] Int. Cl.$^2$ ........................................... G01D 15/10
[52] U.S. Cl. .................................. 346/76 R; 219/216; 346/154; 400/120
[58] Field of Search ................. 346/76 R, 154, 155, 346/162-165; 219/216; 400/120

[56] References Cited

U.S. PATENT DOCUMENTS 3,467,810  9/1969  Cady ................................. 219/216
3,984,844  10/1976  Tanno ............................... 346/76 R

OTHER PUBLICATIONS

Shibata et al, New Type Thermal Printing Head Using Thin Film, IEEE Transactions on Parts, etc., vol. PHP-12, No. 3, pp. 223-230, Sep. 1976.

Primary Examiner—Joseph W. Hartary
Attorney, Agent, or Firm—Oblon, Fisher, Spivak, McClelland & Maier

[57] ABSTRACT

A recording apparatus includes a recording head and a drive circuit for driving the recording head. The recording head includes a plurality of main blocks arranged successively in a given direction and a plurality of first and second conductors. The main blocks each include first and second unit recording blocks arranged in the given direction. Each unit recording block includes n recording units arranged in the given direction. One ends of the n recording units are collectively connected to the selection terminal of each unit recording block. The first conductors each connect the other end of the ith ($n \geq i \geq 1$) of the first recording block with the other end of the $(n+1-i)$th recording unit of the second unit recording block. The second conductors connect the corresponding first conductors in the respective main blocks and bears thereon signals to be recorded. The drive circuit includes first means for selecting a desired one of the unit recording blocks and second means for supplying recording signals to the recording units of the selected unit recording block in the order of the given directional order.

8 Claims, 10 Drawing Figures

F I G. 10
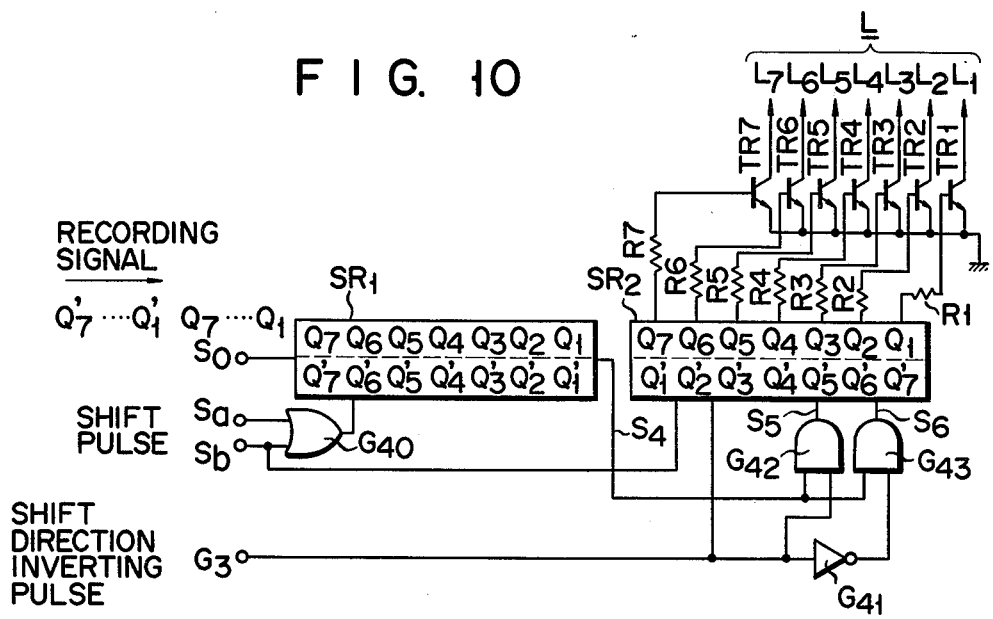
F I G. 11
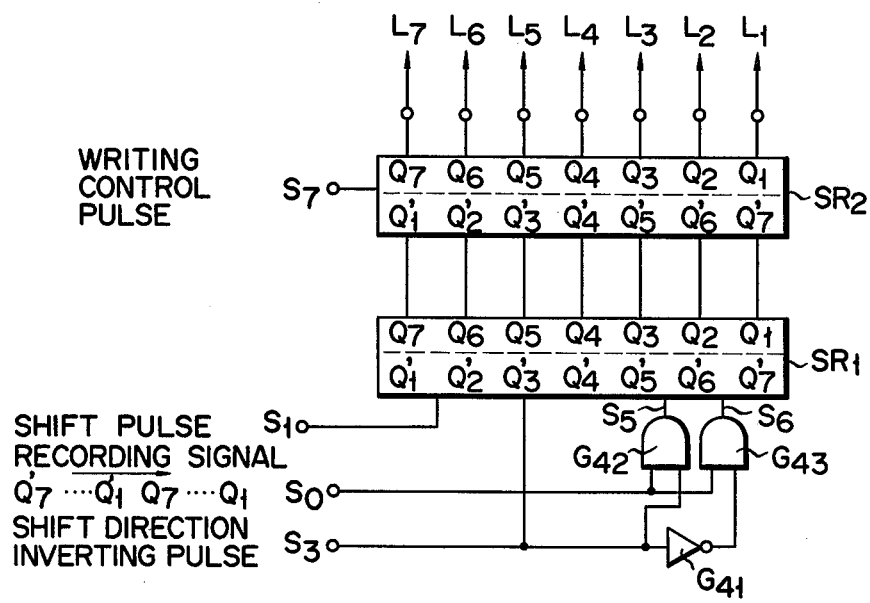

THERMAL RECORDING HEAD AND DRIVE CIRCUIT

The present invention relates to a recording apparatus and more particularly to a thermal recording apparatus.

Recently, facsimiles, printers and the like have employed as recording means a thermal recording apparatus for recording information on a heat sensitive paper by using a recording head with a number of heating resistors serially arranged.

In such a recording apparatus, several hundreds to one thousand recording units are arranged in a row, so that connection between the recording units and its drive circuit is considerably complicated. For simplification of the complicated connection, a diode matrix circuit as shown in FIG. 1 is used to successfully reduce the connecting portions. As shown, a plurality of unit recording blocks $UB_1$, $UB_2$, $UB_3$, ... are serially arranged in a given direction. Each recording unit includes n recording units successively arranged in the block arrangement direction each of which further includes a heating resistor R and a diode D with the polarity as shown these being connected in series. The recording units of n are connected collectively at one ends to a selection terminal of the corresponding unit recording block. For example, one ends of the recording units of the first unit recording block $UB_1$, i.e. one ends of the heating resistors $R_{11}$ to $R_{1n}$, are connected to a selection terminal $C_1$; one ends of the recording units of the second unit recording block $UB_2$, i.e. one ends of the heating resistors $R_{21}$ to $R_{2n}$ to a selection terminal $C_2$; likewise, one ends of the heating resistors $R_{21}$ to $R_{2n}$ to a selection terminal $C_3$. Recording signal feeding lines $L_1$ to $L_n$ are correspondingly connected to the cathodes of the diodes of each unit recording block, as shown in FIG. 1. These cathodes form the other ends of the first to nth recording units of each unit recording block. A drive circuit (not shown) is connected at the recording signal feeding terminals to the lines $L_1$ to $L_n$ and the unit recording block selection terminals to the corresponding selection terminals $C_1$ to $C_n$ of the recording unit blocks. In this connection scheme, number of connection lines connecting heating resistors to diode matrices equals to that of all the heating resistors, however. The connection scheme still suffers from complex connection work. Directed to overcome this problem, another method was developed in which the respective ends of a flexible cable with parallel conductors densely printed thereon are pressured onto the other ends of the heating resistors and a substrate on which the diodes matrices circuit is printed and the diodes are mounted. However, this method provides another new problem of bulkiness of the recording head, being still accompanied by the above-mentioned problem of complex connection work.

A multilayer printing method by using thick film technology was developed to solve such the complexity of the connection, see FIG. 2. In this method, diodes are mounted on an insulating substrate 1 and the matrices wiring associated with the diodes are printed thereon by using the multi-layer wiring method. In the figure, only the multi-layered wiring is depicted. First conductors $l_{11}$ to $l_{1n}$, $l_{21}$ to $l_{2n}$, ... are connected to the diodes $D_{11}$ to $D_{1n}$, $D_{21}$ to $D_{2n}$, ..., respectively, and these conductors are printed with the same interval as of the heating resistors. The conductor density is 4 lines per mm to 6 lines per mm so that the interval $P_1$ of the first conductors is 167 to 250μm. The terminals 2 of the first conductors belonging to a unit recording block are disposed aligning with a dotted line 3 slanted. Insulating layers 4 are printed so as to cover these lines 3. Second conductors (recording signal feeding lines) $L_1$ to $L_n$ are printed on these insulating layers 4. Each of these second conductors is disposed normal to the corresponding conductor (with the same line order as of the first conductor) of each unit recording block at the terminal 2 of the first conductor. At these cross points, holes 5 are formed to the insulating layer 4. By inserting a conductor into each of these holes 5, the first conductors with the same order of the conductor disposition of the respective unit recording blocks are connected commonly to a single second conductor with the corresponding disposition order.

To ensure the connection of the first conductors with the second conductors, the diameter of each hole 5 must be larger than the width of the first conductor. Therefore, there is a possibility that the periphery of the hole 5 comes in contact with the first conductor neighbouring with the hole 5. The experiment conducted by the inventors of the present application showed that, when the interval $P_1$ between adjacent first conductors is less than 200μm, the contact accidents take place very frequently, reducing the yield of the recording head manufacturing. Further, to reduce the contact accidents, the interval $P_1$ must be at least 300μm. As previously stated, the interval $P_1$ is 167 to 250μm and therefore, in order to secure more than 300μm of the interval $P_1$, the intervals of the first conductors must be widened midway between the extremes of interval. Adversely, the widening of the intervals lead to bulkiness of the recording head, however.

As seen from the foregoing, the conventional techniques are troubled with a contradiction that the miniaturization of the recording head reduces the yield of its manufacturing while improvement of the yield brings about bulkiness of the recording head.

Accordingly, the primary object of the present invention is to provide a recording apparatus of which the recording head may be made small in size and with improved yields.

According to the present invention, there is provided a recording apparatus comprising a recording head including a plurality of main blocks arranged in a given direction each main block having first and second unit recording blocks arranged in the given direction each unit recording block further including n recording units each recording unit further including a series-connected diode and recording element pair, a plurality of unit recording block selection terminals each of which is connected to one ends of the n recording units, a plurality of first conductors for connecting the other ends of the ith ($n \geq i \geq 1$) recording units of the first unit recording block with the other ends of the $(n+1-i)$th recording units of the second unit recording block, and a plurality of second conductors for connecting commonly the corresponding first conductors among the main blocks and for supplying signals to be recorded to the recording units; and a drive circuit including first means for selecting a desired one of the unit recording blocks and second means for supplying recording signals in the order of the recording units arrangement to the recording units of the selected unit recording block.

Other objects and features of the invention will be apparent from the following description taken in connection with the accompanying drawings, in which:

FIG. 10 is a modification of the drive circuit of FIG. 7; and

FIG. 11 is another modification of the drive circuit of FIG. 7.

Figure 1:
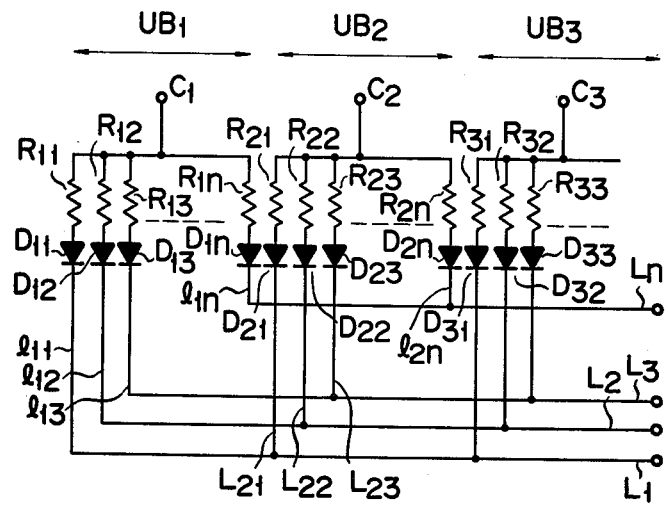
FIG. 1 shows a wiring diagram of a recording head of a conventional recording apparatus.

In the following figures, the same parts are denoted by the same reference numbers as those of FIGS. 1 and 2.

Figure 3:
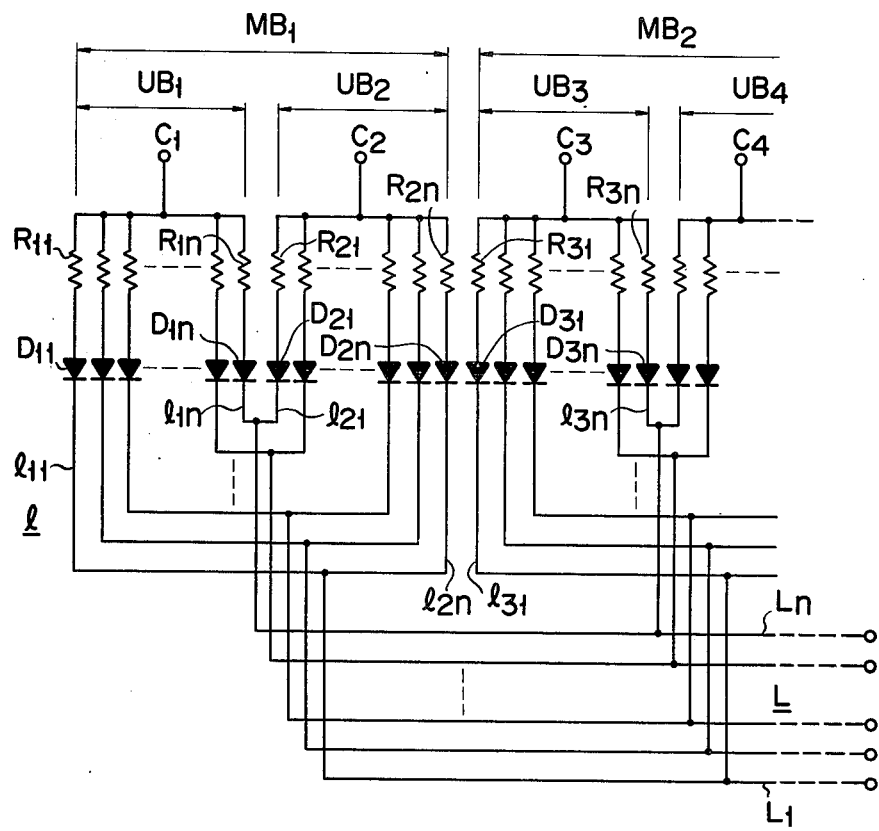
FIG. 3 is a wiring diagram of a recording head of a recording apparatus according to the present invention.

As shown in FIG. 3, main blocks $MB_1$ and $MB_2$ are arranged successively to the right as viewed in the drawing. The main block $MB_1$ includes first and second unit recording blocks $UB_1$ and $UB_2$ disposed in consecutive order to the right as viewed in the drawing. This is correspondingly applied to the other main blocks $MB_2$ and $MB_3$. A heating resistor, for example, $R_{11}$ and a diode, for example, $D_{11}$ are connected in series and these constitute a recording unit. Each of the recording blocks includes n recording units arranged in series order as in the same direction as of the respective unit recording blocks $UB_1$ and $UB_2$ disposition. One ends of the n recording units of each unit recording blocks are connected a selection terminal $C_1$, $C_2$, ... of each unit recording block. In each main block, the other end of the ith ($n \geq i \geq 1$) recording unit of the first unit recording block, for example, $UB_1$ and the other end of the (n+1−i)th recording unit of the second unit recording block are connected by a first conductor. In the figure, the first portion of the first conductor includes conductors $1_{11}$ and $1_{2n}$ and the second portion thereof is illustrated including a conductor connecting the free ends of the conductors $1_{11}$ and $1_{2n}$. The corresponding second portions of the first conductors in the respective main blocks $MB_1$, $MB_2$, ... are connected to recording signal feeding lines $L_1$, $L_2$, ... $L_n$. The diode may be inserted between a recording element and a unit recording block selection terminal.

Figure 4:
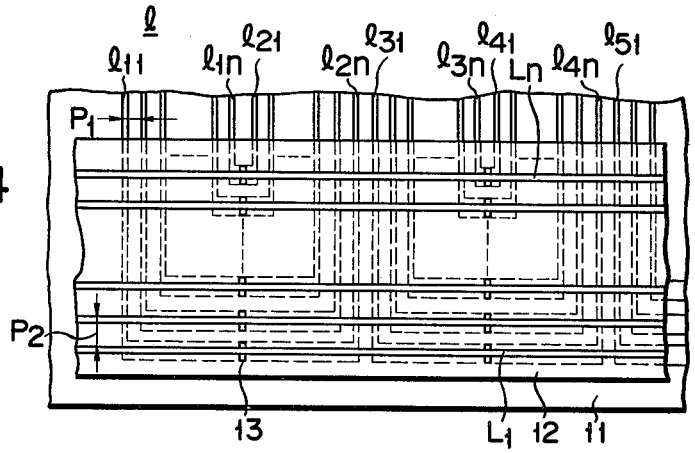
FIG. 4 is an enlarged view of a part of the connection scheme of the FIG. 3 recording head.

FIG. 4 shows a plan view of the matrix wiring portion of the recording head shown in FIG. 3 when it is fabricated by the thick multi-layer printing method. On an insulating substrate 11, recording elements $R_{11}$ to $R_{1n}$, $R_{21}$ to $R_{2n}$, ... and diodes $D_{11}$ to $D_{1n}$, $D_{21}$ to $D_{2n}$, ... (not shown) are provided and the first portion $1_{11}$ to $1_{1n}$, $1_{21}$ to $1_{2n}$, ... of the first conductor which are connected to respective cathodes of diodes $D_{11}$ to $D_{1n}$, $D_{21}$ to $D_{2n}$, ..., are formed thereon by means of the thick film printing technology. The first portion, i.e. conductors $1_{11}$ to $1_{1n}$, $1_{21}$ to $1_{2n}$, ..., are disposed in parallel and the interval $P_1$ therebetween are selected 167 to 250μm (the interval density 4 lines per mm to 6 lines per mm). The second portion of the first conductor is disposed normal to the first portion. The interval $P_2$ of the second portion is selected 300μm or more. An insulating layer 12 is formed by the thick film printing method so as to cover the entire of the second portion. The first conductor group of the main blocks $MB_1$ and $MB_2$, ... are designated by character 1. The insulating layer 12 is provided with a hole 13 at the portion corresponding to the almost center of the second portion of each first conductor. The hole 13 is filled with a conductor. On the insulating layer 12, second conductors $L_1$, $L_2$, ... $L_n$ (recording signal feeding lines) are formed by the thick film printing method. These second conductors pass through the hole 13 and coupled with the conductors of the holes and parallel with the second portion of the first conductor. The group of the second conductor is designated by character L.

Figure 2:
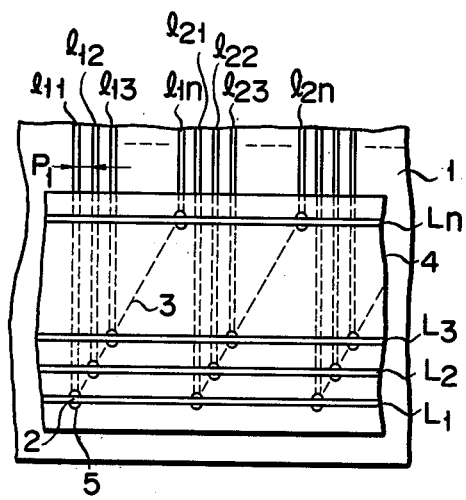
FIG. 2 is an enlarged view of a part of the connection scheme of the recording head shown in FIG. 1.

As seen from FIG. 4, the distance between the connecting portion 13 connecting the first conductor 1 with the second conductor L and the first portion of the first conductor closest to the connecting portion 13 may be substantially three times that of the FIG. 2 case. Therefore, the interval $P_1$ of the first portion of the first conductor satisfactorily prevents shortcircuiting between the first conductors, even with its value of 167μm. This enables the yield of the recording head manufacturing to be improved and the size of the recording head to be small. As seen from FIG. 3, number of the connecting points between the first conductor 1 and the second conductor L in n×m/2 (n is number of the recording units in each unit recording block and m is number of the unit recording blocks), the number is half that of the FIG. 1 or FIG. 2 case. This means that the manufacturing process of the recording head is simplified, the yield is improved and the reliability of it is enhanced.

Figure 5:
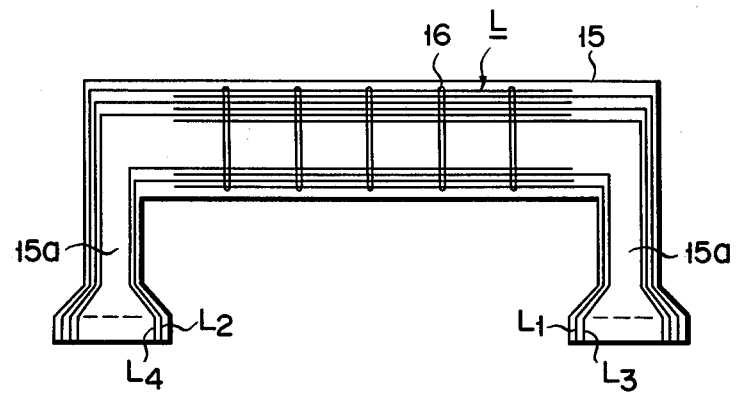
FIG. 5 is a plan view of a modification of the FIG. 4 wiring scheme shown in FIG. 4.
Figure 6:
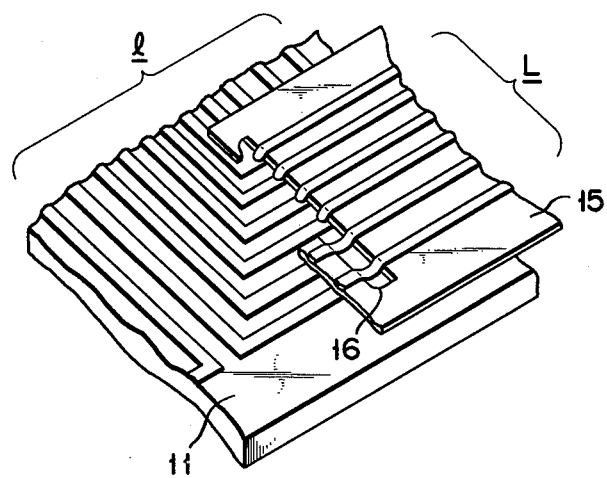
FIG. 6 is a perspective view of an enlarged view of a part of the FIG. 5 connection scheme.

The recording head of the invention may be modified to those shown in FIGS. 5 and 6. In FIG. 5, the printing process of the first conductor 1 onto the insulating substrate 11 (FIG. 4) is much the same as that of the previous case, thus omitting the illustration of it. In this embodiment, flexible film 15 is used instead of an insulating layer 12. (See FIG. 4). The flexible film 15 is a polyimide film of 30 to 100μm thick. The film 15 is printed on the insulating substrate 11 (FIG. 4) so as to cover the entire of the second portion of the second conductor 1 in FIG. 4. On the film 15, a copper film with 50 to 100μm thick is formed and then unnecessary portion thereof is removed by etching method, to form the second conductor L. The film 15 is provided with an elongated hole 16 at the portion corresponding to the hole 13 of FIG. 4. The first conductor 1 and the second conductor L are connected by soldering through the elongated hole 16. FIG. 6 shows an enlargement of the connecting portion of the first conductor 1 and the second conductor L. In the figure, the number n of the recording units is assumed to be 6.

In the FIG. 5 embodiment, the film 15 includes extensions 15a and 15a. On the major land of the film 15, the second conductor L are alternately portioned out to the right and left sides and directly connected at both ends to connectors (not shown). The alternate portioning out makes substantially uniform the resistances of the conductors extending to the heating resistors. Therefore, the density of the recording information on the recording paper may be made uniform.

As seen from FIG. 3, the connection orders of the recording units to the second conductor L in the respective adjacent unit recording blocks are reversed each other. More specifically, the 1st to nth recording units in the first recording block $UB_1$ are connected to the $L_1$ to $L_n$ conductors of the 2nd conductors, respectively. In the second unit recording block $UB_2$, the 1st to nth recording units are correspondingly connected to the $L_n$ to $L_1$ conductors, respectively. Therefore, if a series of recording signals to be fed in the order of the recording unit arrangement (for example, image formation signal) is applied to the second conductors in the order of $L_1, L_2, \ldots L_n$, the image formed by the odd numbered unit recording blocks $UB_1, UB_3, \ldots$ and that by the even numbered unit recording blocks $UB_2, UB_4, \ldots$ are related in reversed fashion. Accordingly, the recording head shown in FIG. 3 must be driven so as not to avoid the image inversion.

Figure 7:
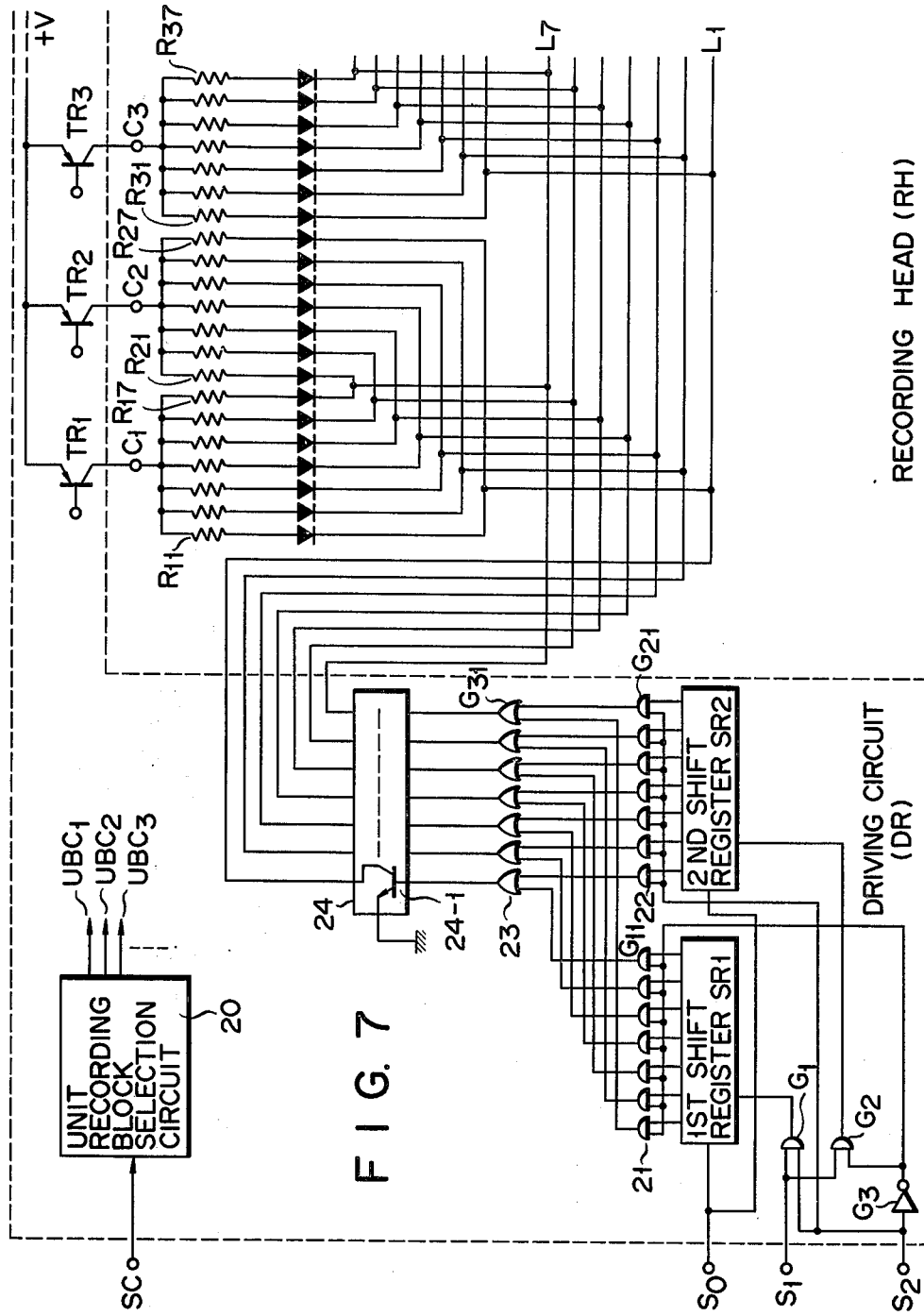
FIG. 7 is circuit diagram illustrating one form of the connection schemes of the recording head shown in FIG. 3 with a drive circuit for it, in which number of the recording units in each unit recording block is 7.

Turning now to FIG. 7, there is shown one form of connection schemes of the recording head RH shown in FIG. 3 and a drive circuit DR. In this example, number n of the recording units is 7. The drive circuit DR includes; first and second shift registers $SR_1$ and $SR_2$; a unit recording block selection circuit 20; drive means to drive first and second shift registers $SR_1$ and $SR_2$; AND gate groups 21 and 22 for reading out the outputs of shift registers $SR_1$ and $SR_2$, respectively; an OR gate group for receiving the outputs of the AND gate groups 21 and 22; and a transistor circuit 24 driven by the output of the OR gate group 23. The unit recording block selection circuit 20 received a selection circuit control signal SC and produces unit recording block selection signals $UBC_1, UBC_2, \ldots$. These unit recording block selection signals are applied to the gate terminals of transistors $TR_1, TR_2, \ldots$, respectively. The emitters of these transistors are commonly connected to $+V$ source. The collectors are coupled with the unit recording block selection terminals $C_1, C_2, \ldots$. The outputs of the OR gates of the OR gate group 23 are connected to the gates of the corresponding transistors of the transistor driving circuit 24, respectively. The emitters of the transistors 24-1 to 24-7 are earthed and the collectors are connected to the second conductors $L_1$ to $L_n$ in this order, respectively.

Figure 8:
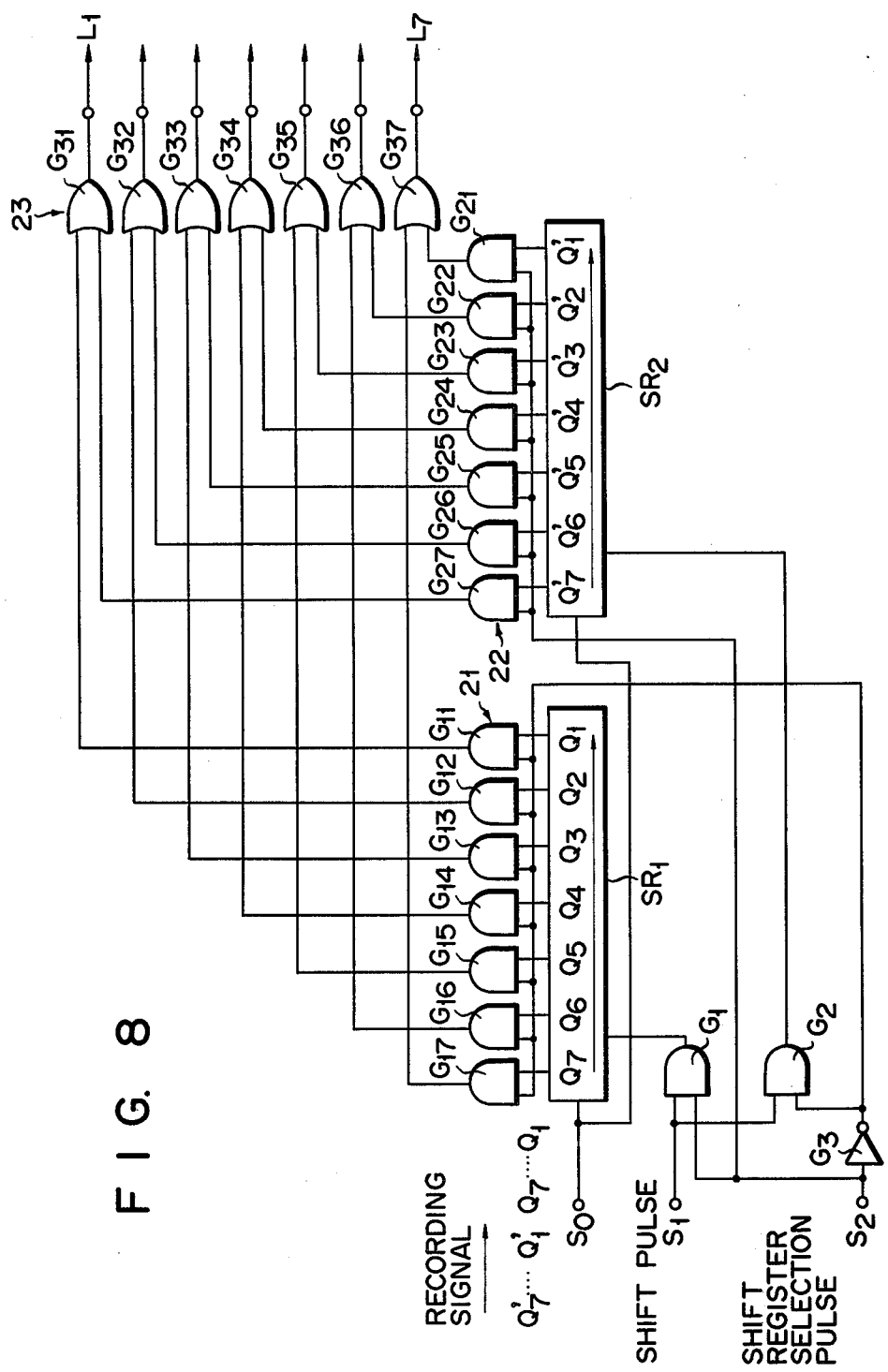
FIG. 8 is a circuit diagram illustrating the details of a part of the FIG. 7 circuit.

The first and second shift register $SR_1$ and $SR_2$, their driving means and the gate groups at the output side thereof are detailed in FIG. 8. As mentioned above, 7 recording units are used in this example so that the contents of the shift registers $SR_1$ and $SR_2$ are each constructed by 7 bits. A picture signal $S_O$ is binary signals serially supplied and is supplied to the shift registers $SR_1$ and $SR_2$. Assume here that the signal supply is made in the serial order of $Q_1$ to $Q_7$ and $Q'_1$ to $Q'_7$. $S_1$ is a shift pulse which is used when the picture signal $S_O$ is loaded into the respective registers, and is applied to one of the inputs of each AND gates $G_1$ and $G_2$. $S_2$ is a selection pulse for selecting either of the shift registers $SR_1$ and $SR_2$ and applied to the other input of the AND gate $G_1$, an inverter $G_3$ and the AND gate group 22. The output of the inverter $G_3$ is applied to the other input of the AND gate $G_2$ and the input of the AND gate group 21. The outputs of the AND gates $G_1$ and $G_2$ are applied as shift pulses to the shift registers $SR_1$ and $SR_2$. Each shift register produces outputs from the respective stages thereof and in this example it produces 7 outputs. As shown, the shift registers each produce 1st to 7th outputs as counted from the right hand side. The ith $(n \geq i \geq 1)$ output of the shift register $SR_1$ and the $(n+1-i)$th output of the shift register $SR_2$ are coupled with the corresponding first conductor through a single OR gate. With an arrangement, as shown, of the AND gate group 21 including AND gates $G_{11}$ to $G_{17}$, the AND gate group 22 including AND gates $G_{21}$ to $G_{27}$, and the OR gate group including OR gates $G_{31}$ to $G_{37}$, the outputs of the OR gates $G_{31}$ to $G_{37}$ are correspondingly coupled with the first conductors $L_1$ to $L_n$, respectively. The recording signal with the contents $Q_1$ to $Q_7$ and $Q'_1$ to $Q'_7$ are fed to the drive circuit in the order of $Q_1$ to $Q_7$ and $Q'_1$ to $Q'_7$. The shift register $SR_1$ and $SR_2$ are shifted in an arrow direction.

Figure 9:
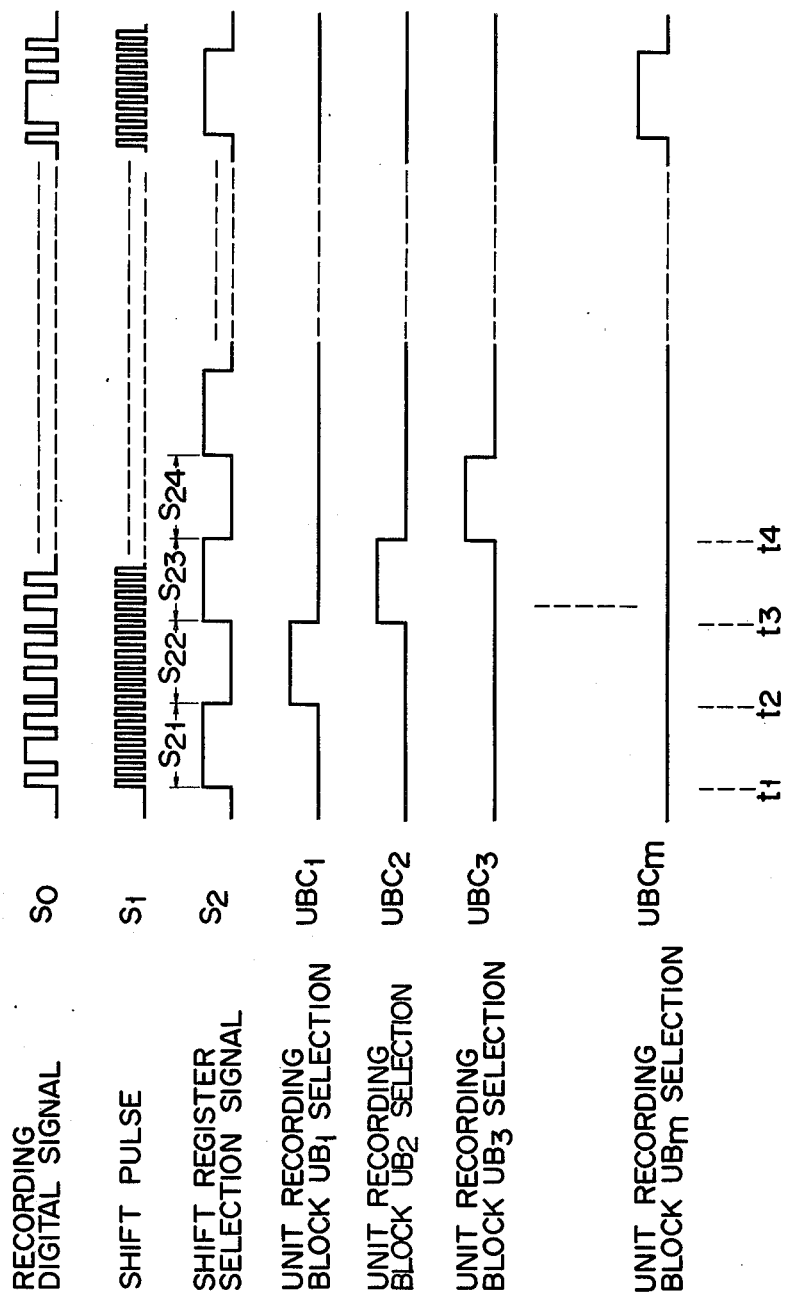
FIG. 9 is a set of timing charts for illustrating the operation of the FIG. 7 circuit.

The operation of the apparatus shown in FIG. 7 will be described with reference to FIGS. 8 and 9. An example to be given is the case where the unit recording blocks $UB_1, UB_2, \ldots$ are successively selected in the order of the designations of the blocks. When the unit recording block selection circuit 20 is driven, it produces pulses $UBC_1, UBC_2, UBC_3, \ldots$ to successively select the unit recording blocks which in turn drive transistors $TR_1, TR_2, TR_3, \ldots$ to select sequentially the unit recording blocks $UB_1, UB_2, UB_3, \ldots$. The shift register selection signal $S_2$, in order to drive the shift registers $SR_1$ and $SR_2$, is transferred to the gate $G_1$, the inverter $G_3$ and the gate group 22. As shown in FIG. 9, the selection signal $S_2$ has alternately and serially arranged "1" and "0" and the time widths of "1" and "0" are equal. The shift register selection signal $S_2$ and the unit recording block selection pulses $UBC_1, UBC_2, UBC_3, \ldots$ are synchronized in a predetermined relation. That is, the unit recording block selection pulses $UBC_1, UBC_2, UBC_3, \ldots$ are produced at the time period $S_{22}, S_{23}, S_{24}, \ldots$, respectively. During each time period $S_{21}, S_{22}, \ldots$, seven shift pulses $S_1$ and seven recording signals $S_O$ are applied to the respective shift registers. At time $t_1$, when the register selection signal $S_2$ is "1", the shift register $SR_1$ is selected and shifted in the arrow direction by the shift pulse $S_1$ fed through and AND gate $G_1$. The recording signal $S_O$ is serially supplied to the shift register $SR_1$ so that the bits $Q_1$ to $Q_7$ of the recording signal $S_O$ are loaded into the shift register $SR_1$ at the time periods $S_{21}$, as shown in the figure. At time $t_2$, when loading of it is completed, the register selection signal $S_2$ is "0" which passes through the inverter $G_3$ to reach as "1" the AND gates $G_{11}$ to $G_{17}$. Therefore, the recording signals $Q_1$ to $Q_7$ are transferred to the second conductors $L_1$ to $L_7$ through the OR gates $G_{31}$ to $G_{37}$. At time $t_2$, the unit recording block selection signal $UBC_1$ is "1" and therefore the recording signals $Q_1$ to $Q_7$ are supplied to the recording elements $R_{11}$ to $R_{17}$ to be recorded on a recording paper (not shown). At time $t_2$, the register selection signal $S_2$ is "0" and is inverted in the inverter $G_3$ to be "1". The inverted "1" signal is applied to the AND gate $G_2$. Upon the reception of the signal "1", the AND gate $G_2$ permits the shift register $SR_2$ to shift in the arrow direction and the recording signal $Q'_1$ to $Q'_7$ to be loaded into the register as shown in the figure. At time $t_3$, when the loading of it is completed, the shift register selection signal $S_2$ becomes again "1" and thus the recording signals $Q'_1$ to $Q'_7$ are applied through the AND gates $G_{21}$ to $G_{27}$ and the OR gates $G_{37}$ to $G_{31}$ to the second conductors $L_7$ to $L_1$. At time $t_3$, the selection signal $UBC_2$ of the unit recording block $UB_2$ is produced, and therefore the recording signals $Q'_1$ to $Q'_7$ are applied to the writing elements $R_{21}$ to $R_{27}$ of the unit writing block $UB_2$. In other words, the recording signals $Q_1$ to $Q_7$ and $Q'_1$ to $Q'_7$ are applied to the recording elements $R_{11}$ to $R_{17}$ and $R_{21}$ to $R_{27}$. In this manner, it is avoidable to reverse the records made by the unit recording blocks $UB_1$ and $UB_2$. Then, when the unit recording block $UB_3$ is selected, the signals to be recorded are successively supplied from the shift register $SR_1$ to the second conductors $L_1$ to $L_7$. In other words, the order in which serially incoming recording signals are supplied to the second conductors is reversed each time the unit recording block is selected with the result that the recording is normally made, i.e. avoiding the picture inversion.

In the description referring to FIG. 7, the unit recording blocks are selected in the order of the arrangement thereof; however, any one of the unit recording blocks may be selected. In this case, when the odd numbered unit recording block is selected, the contents of the first shift register $SR_1$ is recorded and when the even numbered unit recording block is selected, the contents of the second shift register $SR_2$ is recorded.

In the embodiment of FIG. 7, in order to alternately supply the outputs of the shift registers $SR_1$ and $SR_2$ to the second conductor L, the OR gate group 23 is provided between the shift registers $SR_1$ and $SR_2$ and the second conductor L. A modification of this is shown in FIG. 10, in which only the output of the shift register $SR_2$ is supplied to the second conductor L. This modification simplifies the circuit construction of the drive circuit and therefore is advantageous in the manufacturing process and the cost saving.

In FIG. 10, the recording signal $S_O$ is inputted to the first shift register $SR_1$. Shift pulses $S_a$ with first frequency and another shift pulses $S_b$ with second frequency higher than the first one are applied to an OR gate $G_{40}$ of which the output is applied as shift pulses to the first shift register $SR_1$ of seven bits. Shift pulses $S_b$ are applied as shift pulses to the second shift register $SR_2$ (Buffer Register). A recording signal $S_4$ fed from the first shift register $SR_1$ is applied to one of the inputs of each AND gate $G_{42}$ and $G_{43}$. A pulse $S_3$ for switching the shift direction of the second shift register $SR_2$ is applied to the second shift register $SR_2$ while at the same time to the other input of the AND gate $G_{42}$. The same pulse $S_3$ is applied to the other input of the AND gate $G_{43}$ through an inverter $G_{41}$.

Output pulse $S_5$ (a right-shift pulse) of the AND gate $G_{42}$ switches the shift direction of the shift register $SR_2$ to the right and serves as an input to the shift register $SR_2$ to load into the position shown in the figure the input signals $Q_1$ to $Q_7$, through the first shift register $SR_1$. Output pulse $S_6$ (a left-shift pulse) of the AND gate $G_{43}$ changes the shift direction of the shift register $SR_2$ to the left, thereby to load the input signals $Q'_1$ to $Q'_7$ into the position shown in the figure. The outputs of the 1st to 7th stages as counted from the right on the drawing are coupled with the bases of transistors $TR_1$ to $TR_7$, through resistors $R_1$ to $R_7$. The emitters of transistors $TR_1$ to $TR_7$ are connected commonly and the collectors thereof are connected to the second conductors $L_1$ to $L_7$. The recording signal $S_O$, for example, $Q_1$ to $Q_7$ and $Q'_1$ to $Q'_7$, are serially inputted into the first shift register $SR_1$. In this case, the recording signals $Q_1$ to $Q_7$ are firstly loaded into the register $SR_1$ by the shift pulse $S_a$. When the loading of it into the shift register $SR_1$ is completed, the pulse $S_3$ becomes "1" to change the shift direction of the shift register $SR_2$ to the right. At the same time, the shift pulse $S_b$ feeds the recording signals $Q_1$ to $Q_7$ ($S_4$) stored in the register $SR_1$ to the AND gate $G_{42}$ and $G_{43}$. At this time, the shift direction switch pulse is "1" and therefore the AND gate $G_{42}$ is enabled. The output $S_5$ of the AND gate $G_{42}$ is connected to the right shift input of the register $SR_2$. For this, the shift pulse $S_b$ transfers the contents $Q_1$ to $Q_7$ of the register $SR_1$ from the shift register $SR_1$ to $SR_2$ at high rate, through AND gate $G_{42}$.

The contents $Q_1$ to $Q_7$ of the register $SR_2$ are supplied to the second conductors $L_1$ to $L_7$. At this time, as described referring to FIG. 7, the odd numbered unit recording block, for example, $UB_1$, is selected so that the recording signals $Q_1$ to $Q_7$ are supplied to the writing elements $R_{11}$ to $R_{17}$ (see FIG. 7). Then, the recording signals $Q'_1$ to $Q'_7$ are loaded into the first shift register $SR_1$ by the shift pulse $S_a$. Upon the completion of the loading, the pulse $S_3$ becomes "0" to change the shift direction of the register $SR_2$ to the left as viewed on the drawing. And the pulse $S_3$ passes through the inverter $G_{41}$ to one of the inputs of AND gate $G_{43}$, thereby to enable the gate $G_{43}$. Accordingly, the recording signals $Q'_1$ to $Q'_7$ ($S_4$) becomes an output signal $S_6$ to be applied as a left shift input signal of the shift register $SR_2$ to the register $SR_2$. At this time, the shift pulse $S_b$ is applied to the registers $SR_1$ and $SR_2$ to permit the recording signals $Q'_1$ to $Q'_7$ to be transferred to the position shown in the FIGURE of the shift register $SR_2$. Accordingly, the recording signals $Q'_1$ to $Q'_7$ are delivered to the second conductors $L_7$ to $L_1$.

At this time, the unit writing block, for example, $UB_2$ (FIG. 7), is selected so that the recording signal $Q'_1$ to $Q'_7$ are applied to the writing elements $R_{21}$ to $R_{27}$. In this way, while the shift direction of the first shift register $SR_1$ is fixed, the shift direction of the second shift register $SR_2$ is reversed each time the unit recording block is selected. Through that operation, the recording signal may be recorded on the recording paper with normal relative positions of the pictures recorded.

FIG. 11 shows an example to reverse the shift direction of the first shift register $SR_1$ each time the unit recording block is selected. In the figure, the recording signal $S_0$ provides bit signals $Q_1$ to $Q_7$ and $Q'_1$ to $Q'_7$ in this order to the first shift register $SR_1$. The writing shift pulse $S_1$ is coupled with the shift register $SR_1$. The recording signal $S_0$ is supplied to one of the inputs of each AND gate $G_{42}$ and $G_{43}$, and the shift direction switching pulse $S_3$ is supplied to the other input of the AND gate $G_{42}$ and with the other input of the AND gate $G_{43}$ through an inverter $G_{41}$. The pulse $S_3$ is also coupled with the register $SR_1$ in order to change the shift direction of the register $SR_1$. The output $S_5$ of the AND gate $G_{42}$ is applied to the shift register $SR_1$ to be shifted to the right direction while the output $S_6$ of the AND gate $G_{42}$ is applied to the shift register $SR_1$ to be shifted to the left direction.

The contents of the shift register $SR_1$ are simultaneously transferred in parallel to the second shift register $SR_2$ by a writing control pulse $S_7$. The contents of the respective stages of the second shift register $SR_2$ are delivered to the second conductors $L_1$ to $L_7$, in response to the writing control pulse $S_7$. The shift direction switching pulse $S_3$ "1" and the output of the AND gate $G_{42}$ cooperate to load the recording signals $Q_1$ to $Q_7$ into the position as shown of the register $SR_1$. The writing control pulse $S_7$ transfers in parallel the loaded contents to the second conductors $L_1$ to $L_7$. At this time, the odd numbered recording block, for example, $UB_1$, is selected so that the recording signals $Q_1$ to $Q_7$ are applied to the writing elements $R_{11}$ to $R_{17}$. Then, the shift direction switching pulse $S_3$ becomes "0" so that the AND gate $G_{43}$ is enabled and the recording signal $S_0$ goes to the input of the first shift register $SR_1$ to be shifted in the left, through the AND gate $G_{43}$. The shift direction switch pulse $S_3$ shifts the register $SR_1$ to the left so that the recording signals $Q'_1$ to $Q'_7$ are loaded into the position as shown. After this, the writing control pulse $S_7$ transfers the contents of the first shift register $SR_1$ to the second shift register $SR_2$, in parallel fashion, from which the contents are delivered to the second conductors $L_7$ to $L_1$. At this time the odd numbered unit recording block, e.g. $UB_2$, is selected and therefore the recording signals $Q'_1$ to $Q'_7$ are supplied to the recording elements $R_{21}$ to $R_{27}$.

While the description thus far described relates to the thermal recording apparatus, the invention may also be applied to electrostatic recording apparatuses, the discharge recording apparatuses and the like.

What we claim is:

1. A recording apparatus comprising:

a recording head including a plurality of main blocks arranged in a given direction each main block having first and second unit recording blocks arranged in the given direction each unit recording block further including n recording units each recording unit further including a series-connected diode and recording element pair, a plurality of unit recording block selection terminals each of which is connected to one end of said n recording units, a plurality of first conductors for connecting the other ends of the ith ($n \geq i \geq 1$) recording units of said first unit recording block with the other ends of the $(N+1-i)$ recording units of said second unit recording block, and a plurality of second conductors for connecting commonly the corresponding first conductors among said main blocks and for supplying signals to be recorded to said recording units; and a drive circuit including first means for selecting a desired one of said unit recording blocks and second means for supplying recording signals in the order of said recording units arrangement to the recording units of said selected unit recording block.

2. A recording apparatus according to claim 1, in which said recording element is a resistor for heat sensitive paper.

3. A recording apparatus according to claim 1, in which said drive circuit includes: first means for selecting said unit recording blocks in the given order; and second means for inverting the order in which serially incoming recording signals are supplied to said second conductors each time said unit recording block selection is made.

4. A recording apparatus according to claim 3, in which said second means includes: first and second shift registers each having n output stages into which said recording signals are loaded with shifting them therein in the same direction; means for supplying to a corresponding one of said second conductors the output of the ith ($n \geq i \geq 1$) stage of said first shift register or the output of the $(+1-i)$ th stage of said second shift register through OR gate means; and means for initiating loading of said recording signals into one of said shift registers upon completion of the loading of said recording signals into the other shift register while at the same time for coupling the outputs of the respective stages of said other shift register with said second conductors through said OR gate means.

5. A recording apparatus according to claim 3, in which said second means includes: a first shift register with n output stages into which recording signals are loaded in serial fashion; a second shift register with n output stages coupled with said corresponding second conductors, into which the contents of said first shift register are loaded in serial fashion; and means for inverting the shift direction of said second shift register when the contents of said first shift register is transferred into said second shift register, each time the selection of said unit recording block is made.

6. A recording apparatus according to claim 3, in which said second means includes: a first shift register with n output stages into which said recording signals are serially loaded; a second shift register with n output stages coupled with said corresponding second conductors, into which the contents of said first shift register is loaded in parallel manner; and means for inverting the shift direction of said first shift register when said recording signals are serially loaded into said first shift register, each time the selection of said unit recording block is made.

7. A recording apparatus according to claim 1, in which said first conductors include a couple of first portions connected with the other ends of said recording units, and a second portion for connecting the free ends of said first portion and said first conductors are formed on an insulating substrate, said second conductors are provided in parallel with said second portion of said corresponding first conductors, through an insulating layer, and said second portion of said corresponding first conductor and said second conductors are connected through holes formed to said insulating layer.

8. A recording apparatus according to claim 7, in which said first portions of said first conductors are all disposed in parallel, said second portions are disposed normal to said first portions, and said second conductors and said first conductors are connected at almost central portions of said second portions of said first conductors.

* * * * *